US012665148B2

(12) United States Patent
Lanjekar et al.

(10) Patent No.: US 12,665,148 B2
(45) Date of Patent: Jun. 23, 2026

(54) BI-STABLE ASSEMBLY FOR A SWITCHABLE ELECTRICAL APPARATUS

(71) Applicant: Eaton Intelligent Power Limited, Dublin (IE)

(72) Inventors: Puneet Lanjekar, Nasik (IN); Matthew Froemming, Milwaukee, WI (US)

(73) Assignee: Eaton Intelligent Power Limited, Dublin (IE)

( * ) Notice: Subject to any disclaimer, the term of this patent is extended or adjusted under 35 U.S.C. 154(b) by 310 days.

(21) Appl. No.: 18/235,414

(22) Filed: Aug. 18, 2023

(65) Prior Publication Data

US 2024/0096570 A1 Mar. 21, 2024

Related U.S. Application Data

(60) Provisional application No. 63/407,810, filed on Sep. 19, 2022.

(51) Int. Cl.

*H01H 19/20* (2006.01)
*H01H 3/38* (2006.01)
*H01H 19/14* (2006.01)

(52) U.S. Cl.

CPC .............. *H01H 19/20* (2013.01); *H01H 3/38* (2013.01); *H01H 19/14* (2013.01)

(58) Field of Classification Search

CPC .......... H01H 19/20; H01H 3/38; H01H 19/14; H01H 3/00; H01H 3/02; H01H 3/04; H01H 3/32; H01H 3/42; H01H 19/00; H01H 19/02; H01H 19/12; H01H 19/28; H01H 19/36; H01H 2003/00; H01H 2003/02; H01H 2003/32; H01H 5/18; H01H 33/32; H01H 33/42; H01H 33/666; H01H 71/46

(Continued)

(56) References Cited

U.S. PATENT DOCUMENTS

| | | | |
|---|---|---|---|
| 2,395,698 | A | 2/1946 | Tiffany |
| 4,016,385 | A | 4/1977 | Golioto |
| 4,829,279 | A | 5/1989 | Kicherer et al. |
| 6,861,785 | B2 | 3/2005 | Andre et al. |
| 7,138,892 | B2 | 11/2006 | Benard et al. |
| 9,741,482 | B2 | 8/2017 | Weisburgh et al. |

(Continued)

FOREIGN PATENT DOCUMENTS

| | | | |
|---|---|---|---|
| EP | 0717426 | B1 | 3/1999 |
| EP | 2843679 | A1 | 3/2015 |

OTHER PUBLICATIONS

European Patent Office, International Search Report and Written Opinion, counterpart PCT Application No. PCT/EP2023/025400, mailed Jan. 4, 2024, 16 pages total.

(Continued)

*Primary Examiner* — Anthony R Jimenez

(74) *Attorney, Agent, or Firm* — DiBerardino McGovern IP Group LLC

(57) ABSTRACT

A bi-stable assembly for a switch assembly includes: a cam configured to have two stable positions: a first stable position, and a second stable position; a flexible member that includes: a first holding portion; a second holding portion; and a middle portion between the first holding portion and the second holding portion; and an operating interface configured to rotate the cam relative to the flexible member. The first holding portion is configured to hold the cam in the first stable position; and the second holding portion is configured to hold the cam in the second stable position.

23 Claims, 8 Drawing Sheets

(58) Field of Classification Search
USPC .......................................................... 200/336
See application file for complete search history.

(56) References Cited

U.S. PATENT DOCUMENTS

| | | | | |
|---|---|---|---|---|
| 9,953,772 | B2 | 4/2018 | Korves et al. | |
| 2009/0032379 | A1* | 2/2009 | Hamm ..................... | H01H 3/40 200/501 |
| 2022/0189722 | A1 | 6/2022 | Nikolic | |

OTHER PUBLICATIONS

3d Printer Academy, "What 2 things make this 3d printed fidget switch so special?" http://www.youtube.com/watch?v=cHNzs2, Jul. 23, 2022.

"Nova NX-T Recloser Installation and Operation Instructions", Reclosers MN280087EN, Effective Mar. 2018, Cooper Power Series, 28 total pages.

"Nova™ STS-15, Nova™ STS-27, and Nova™ STS-38, Single-Tank, Triple-Single, Electronically Controlled Recloser Installation and Operation Instructions", Reclosers MN280046EN, Effective May 2016, Cooper Power Series, 28 total pages.

"Nova™ three-phase, microprocessor-controlled recloser", Reclosers Catalog Data CA280003EN, Effective Mar. 2015, Cooper Power Series, 12 total pages.

"Nova triple-single, electronically controlled recloser installation and operation instructions", Reclosers MN280045EN, Effective Apr. 2016, Cooper Power Series, 28 total pages.

"Spear™ Single-Phase Recloser System Installation and Operation Instructions", Reclosers MN280048EN, Effective Jun. 2016, Cooper Power Series, 47 total pages.

* cited by examiner

BI-STABLE ASSEMBLY FOR A SWITCHABLE ELECTRICAL APPARATUS

CROSS-REFERENCE TO RELATED APPLICATION

This application claims the benefit of U.S. Provisional Application No. 63/407,810, filed on Sep. 19, 2022, and titled BI-STABLE ASSEMBLY FOR A SWITCHABLE ELECTRICAL APPARATUS, which is incorporated herein by reference in its entirety.

TECHNICAL FIELD

This disclosure relates to a bi-stable assembly for a switchable electrical apparatus.

BACKGROUND

A switchable electrical apparatus is an electrical apparatus that has two stable states, a first state in which electrical current may flow through a switch in the electrical apparatus, and a second state in which electrical current cannot flow the switch. The electrical apparatus is used in an alternating current (AC) power system.

SUMMARY

In one aspect, an electrical apparatus includes: a switch assembly including: a first electrical contact; and a second electrical contact configured to move relative to the first electrical contact. The switch assembly is closed when the second electrical contact is in contact with the first electrical contact, and the switch assembly is open when the second electrical contact is not in contact with the first electrical contact. The electrical apparatus also includes: an actuator coupled to the second electrical contact and configured to move the second electrical contact relative to the first electrical contact; and a bi-stable assembly configured to drive the actuator. The bi-stable assembly also includes: a cam; and a flexible member that includes a first holding portion, a second holding portion, and a middle portion between the first holding portion and the middle member. The electrical apparatus also includes an operating interface coupled to the cam. The operating interface is configured to rotate the cam such that the cam makes contact with and moves along the middle portion of the flexible member between a first stable position and a second stable position, the first holding portion of the flexible member is configured to hold the cam in the first stable position, and the second holding portion of the flexible member is configured to hold the cam in the second stable position.

Implementations may include one or more of the following features.

The flexible member may include a single flexible strip of solid material that includes a first end and a second end, the first end may be in a first guide region of a support structure, the second end may be in a second guide region of the support structure, and the middle portion may be curved and extends away from the support structure. When the operating interface rotates the cam along the middle portion, the cam may press the middle portion toward the support structure. After the cam rotates past at least part of the middle portion, the middle portion may move away from the support structure.

The flexible member may include a leaf spring.

The flexible member may include a linear wave spring.

In some implementations, the electrical apparatus also includes a housing that encloses the switch assembly, the cam, and the flexible member. The operating interface may be accessible from an exterior of the housing. The operating interface may include a shaft that passes through the housing; and a handle mounted on an end of the shaft that is outside the housing. The cam may be mounted on the shaft, and moving the handle may rotate the cam along the middle portion of the flexible member. The handle may be configured to be moved through a range of motion along an arc; the handle may have a first stable position at a first end of the range of motion; and the handle may have a second stable position at a second end of the range of motion. In some implementations, the handle does not have any other stable positions other than the first stable position and the second stable positon.

The cam may include a body and a curved tip, and the curved tip may be configured to make contact with the middle portion of the flexible member.

In another aspect, a bi-stable assembly for a switch assembly includes: a cam configured to have two stable positions: a first stable position, and a second stable position; a flexible member that includes: a first holding portion; a second holding portion; and a middle portion between the first holding portion and the second holding portion; and an operating interface configured to rotate the cam relative to the flexible member. The first holding portion is configured to hold the cam in the first stable position; and the second holding portion is configured to hold the cam in the second stable position.

Implementations may include one or more of the following features.

The flexible member may include a leaf spring.

The flexible member may include a linear wave spring.

The cam may include a tip, and, in some implementations, the tip is the only part of the cam that makes contact with the middle portion. The tip may include a curved profile.

The flexible member may have an uncompressed state; the middle portion may have a first position when the flexible member is in the uncompressed state; and cam may press the middle portion away from the first position while rotating.

The bi-stable assembly also may include a support that holds the flexible member. The cam may press the middle portion of the flexible member toward the support when rotated. The flexible member may extend from a first end to a second end, and at least one of the first end and the second may be secured to the support. The flexible member may extend from a first end to a second end, and the first end and the second are not necessarily secured to the support.

Implementations of any of the techniques described herein may be an electrical apparatus, a bi-stable assembly, a cam assembly, a system, a method, or a process. The details of one or more implementations are set forth in the accompanying drawings and the description below. Other features will be apparent from the description and drawings, and from the claims.

DRAWING DESCRIPTION

DETAILED DESCRIPTION

Figure 1A:
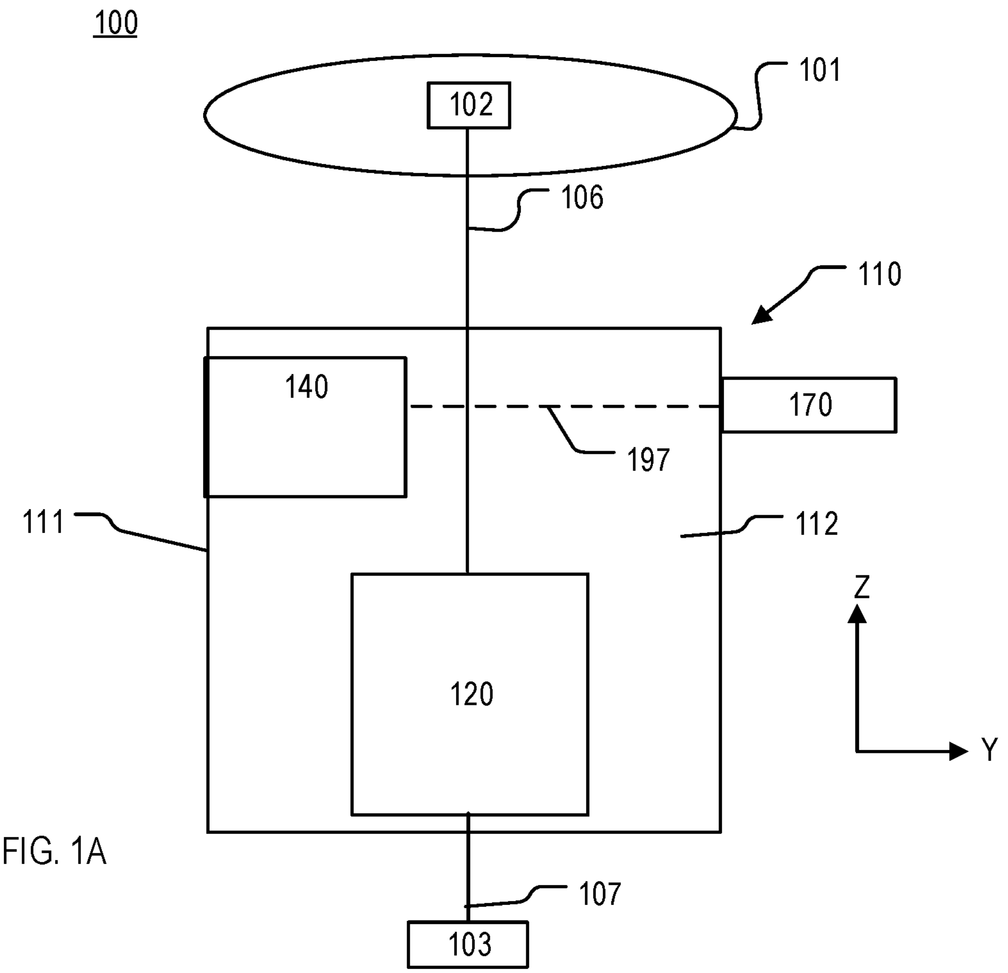
FIG. 1A is a block diagram of a system that includes an example of an electrical apparatus.

FIG. 1A is a block diagram of a system 100 that includes an electrical apparatus 110. The electrical apparatus 110 includes a switch assembly 120, a bi-stable assembly 140, and an operating interface 170 coupled to the bi-stable assembly 140 by a link 197. The link 197 may be a mechanical link such as a shaft. The switch assembly 120 has two operating states: a first operating state in which current may flow in the switch assembly 120 (a closed state) and a second operating state in which current cannot flow in the switch assembly 120 (a closed state). The electrical apparatus 110 may be, for example, an autorecloser, a recloser, or a switchgear. The switch assembly 120 is any type of switch that has a moving contact that is positionable to place the switch assembly 120 in one of the two stable operating states. For example, the switch assembly 120 may be a vacuum interrupter. The operating interface 170 allows manual operation of the switch assembly 120. The bi-stable assembly 140 has two stable states and ensures that the operating interface 170 has only two stable positions. Each of the two stable positions of the bi-stable assembly 140 corresponds to one of two operating states of the switch assembly 120.

Legacy operating handles may be configured for use in one of two stable positions using a relatively complex system that includes coiled springs and their associated components, such as, for example, spring guides, spring mounts, and mounting pins. The coil springs and their associated components take up a relatively large amount of space, introduce additional complexity, and increase overall costs of operation. As discussed in greater detail below, the bi-stable assembly 140 has fewer components, takes up less space, is easier to assemble and/or repair, and is simpler than the legacy approach for ensuring that an operating interface of an electrical apparatus has only two stable positions. Thus, the bi-stable assembly 140 may reduce the overall cost and size of the electrical apparatus 110 and also may encourage efficient operation of the electrical apparatus 110.

Before discussing the bi-stable assembly 140 further, additional details of the electrical apparatus 110 and the system 100 are provided.

The switch assembly 120 is attached to a node 102 via a conductor 106 and to a node 103 via a conductor 107. The conductors 106 and/or 107 are any type of device or apparatus that conducts electricity. For example, the conductors 106 and/or 107 may be transmission lines, cables, wires, and/or busbars. When the switch assembly 120 is in the closed state, the node 102 is electrically connected to the node 103. When the switch assembly 120 is in the opened state, the node 102 is not electrically connected to the node 103.

The node 102 is part of an alternating-current (AC) power grid 101. The AC power grid 101 may be a three-phase power grid that operates at a fundamental frequency of, for example, 50 or 60 Hertz (Hz). In some implementations, the AC power grid 101 is a single-phase power grid that operates at a fundamental frequency of 50 or 60 Hz. The power grid 101 includes devices, systems, and components that transfer, distribute, generate, and/or absorb electricity. For example, the power grid 101 may include generators, power plants, electrical substations, transformers, renewable energy sources, transmission lines, reclosers and switchgear, fuses, surge arrestors, combinations of such devices, and any other device used to transfer or distribute electricity.

The power grid 101 may be low-voltage (for example, up to 1 kilovolt (kV)), medium-voltage or distribution voltage (for example, between 1 kilovolts (kV) and 35 kV), or high-voltage (for example, 35 kV and greater). The power grid 101 may include more than one sub-grid or portion. For example, the power grid 101 may include AC micro-grids, AC area networks, or AC spot networks that serve particular customers. These sub-grids may be connected to each other via switches and/or other devices to form the grid 101. Moreover, sub-grids within the grid 101 may have different nominal voltages. For example, the grid 101 may include a medium-voltage portion connected to a low-voltage portion through a distribution transformer.

The power grid 101 may be arranged in any manner. For example, all or part of the power grid 101 may be underground. All or part of the power grid 101 may be overhead. In some implementations, the power grid 101 includes portions that are overhead and portions that are underground.

The node 102 may be any part of the AC power grid 101. For example, the node 102 may be an AC power source. The node 103 also may be part of the AC power grid 101, or the node 103 may be part of a different AC power grid. The node 103 may be electrically connected to a load (referred to as the load 103) that receives and/or supplies electrical power to the AC power grid 101. The load 103 may be any device that uses, transfers, or distributes electricity in a residential, industrial, or commercial setting, and the load 103 may include more than one device. For example, the load 103 may be a motor, an uninterruptable power supply, or a lighting system. The load 103 may be a device that connects the electrical apparatus 110 to another portion of the power grid 101. For example, the load 103 may be a recloser or switchgear, a transformer, or a point of common coupling (PCC) that provides an AC bus for more than one discrete load. The load 103 may include one or more distributed energy resources (DER). A DER is an electricity-producing resource and/or a controllable load. Examples of DER include, for example, solar-based energy sources such as, for example, solar panels and solar arrays; wind-based energy sources, such as, for example wind turbines and windmills; combined heat and power plants; rechargeable sources (such as batteries); natural gas-fueled generators; electric vehicles; and controllable loads, such as, for example, some heating, ventilation, air conditioning (HVAC) systems and electric water heaters.

Each node 102 and 103 is shown as a single element in FIG. 1A. However, the nodes 102 and 103 may include multiple nodes, each being electrically connected to one phase of the AC power grid 101. The electrical apparatus 110 may be a single-phase or a multi-phase apparatus.

Figure 1B:
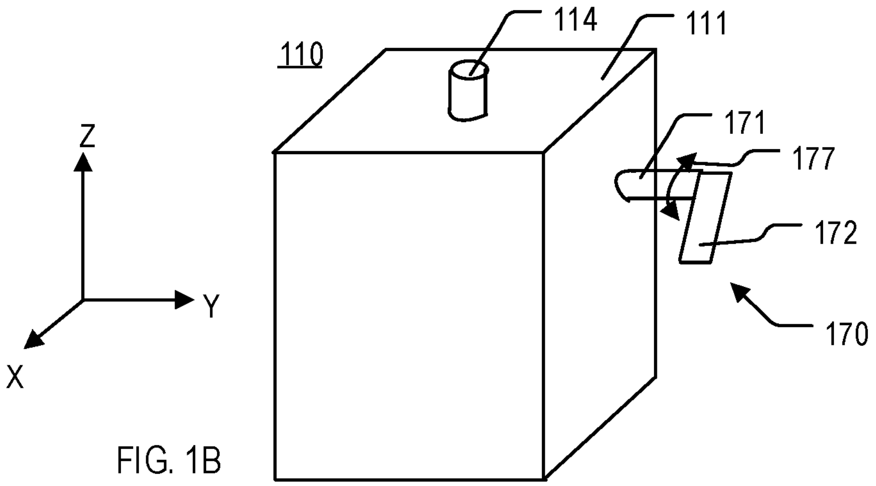
FIG. 1B is a perspective exterior view of a housing of the electrical apparatus of FIG. 1A.

The electrical apparatus 110 includes a housing 111 that encloses the switch assembly 120 and the bi-stable assembly 140 in an interior space 112. Referring also to FIG. 1B, which is a perspective view of the housing 111, the housing 111 is a three-dimensional body. In the example shown in FIG. 1B, the housing 111 is a parallelepiped with six sides (three of which are shown). The housing 111 may have other shapes. The housing 111 is made of any type of rugged material that protects the items in the interior space 112 from debris and the surrounding environment. The housing 111 includes a bushing 114 that allows the conductor 106 to pass through the housing 111 and electrically connect to the switch assembly 120.

In the example of FIG. 1B, the link 197 is a shaft 171 that passes through the housing 111. The shaft 171 is coupled to a handle 172 and to the bi-stable assembly 140. The handle 172 is movable between two stable positions along an arc 177. Moving the handle 172 drives the bi-stable assembly 140 from one stable state to the other stable state, which transitions the switch apparatus 120 from the closed state to the opened state.

Other implementations are possible. For example, the operating interface 170 includes the handle 172 and the shaft 171. However, in other implementations, the operating interface 170 may include additional and/or different components. For example, operating interface 170 may be implemented with a push-button or a dial instead of the handle 172.

Figure 2A:
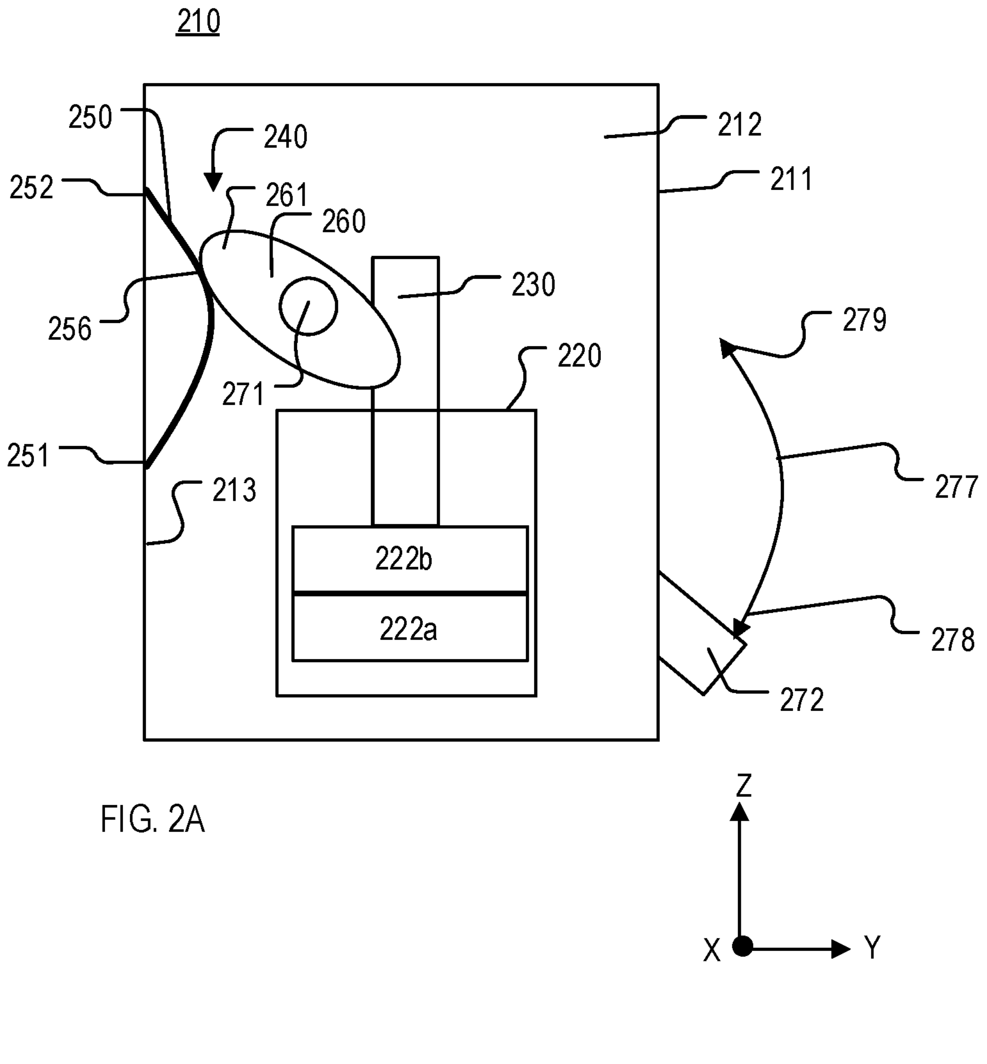
FIG. 2A is a cross-sectional block diagram of an interior of an example of a housing for an electrical apparatus.

FIG. 2A is a cross-sectional block diagram of an interior 212 of a housing 211 of an electrical apparatus 210. The electrical apparatus 210 is an example of an implementation of the electrical apparatus 110 (FIG. 1A). The electrical apparatus 210 may be used in the AC power grid 101 (FIG. 1A).

The electrical apparatus 210 includes a switch assembly 220 in the interior 212. The switch assembly 220 includes a first electrical contact 222*a* and a second electrical contact 222*b* that is movable relative to the first electrical contact 222*a*. The second electrical contact 222*b* is coupled to an actuator 230. The actuator 230 may be coupled to the electrical contact 222*b* using an operating rod and/or any other mechanical linking device.

Figure 2B:
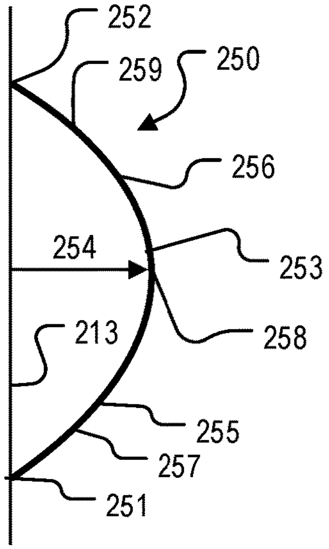
FIG. 2B is a side view of an example of a flexible member.
Figure 6A:
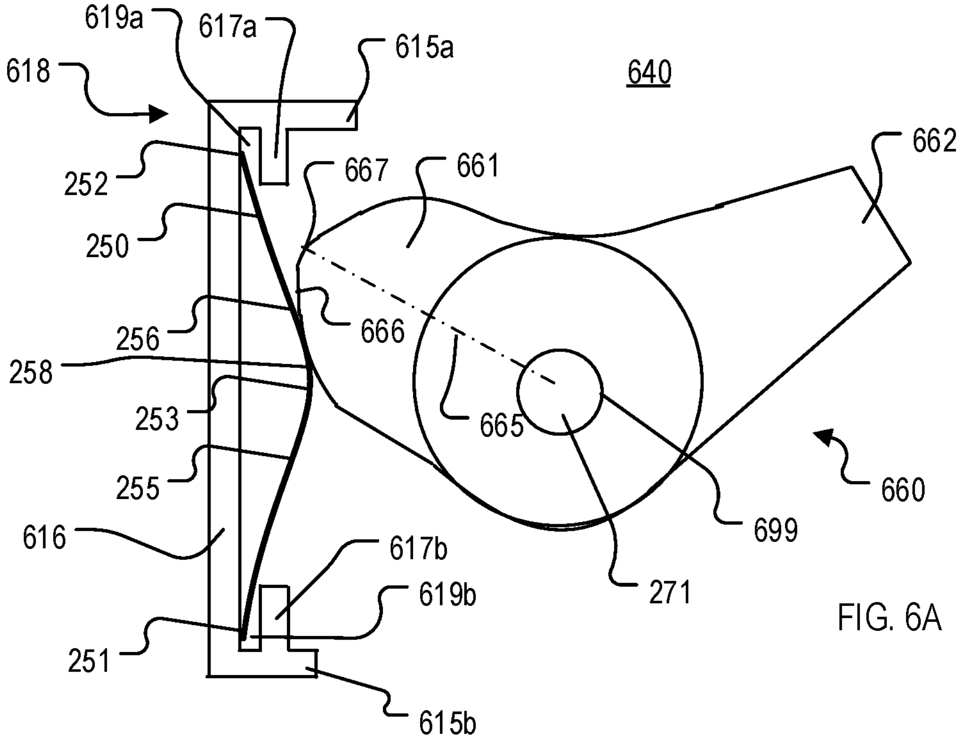
FIG. 6A shows an example of a bi-stable assembly in a first stable position.
Figure 6B:
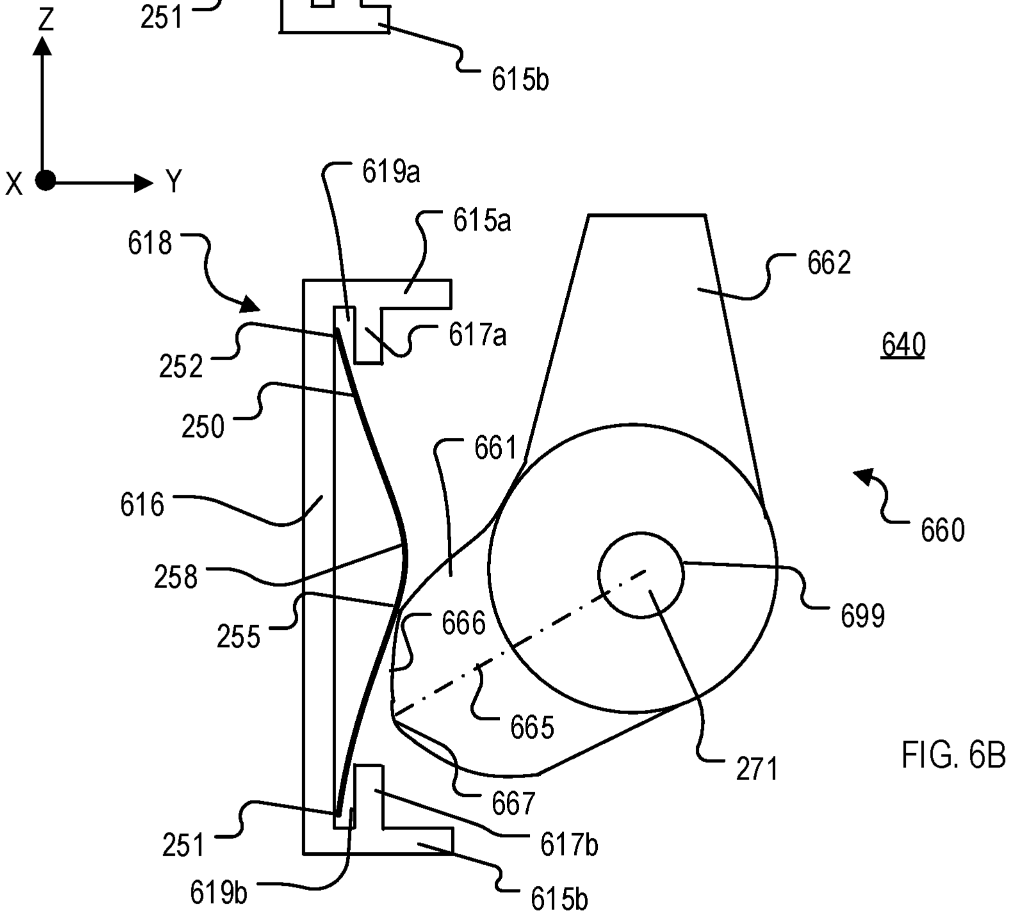
FIG. 6B shows an example of the bi-stable assembly of FIG. 6A in a second stable position.

The actuator 230 is driven by a bi-stable assembly 240 that has two stable positions. The bi-stable assembly 240 includes a flexible member 250 and a cam assembly 260. Referring also to FIGS. 2B and 2D, the flexible member 250 includes a first end 251 to a second end 252. The first end 251 and the second end 252 are mounted to an interior wall 213 of the housing 211. The first end 251 and the second end 252 are mounted to the interior wall 213 in a manner that allows the end 251 and/or the end 252 to move along the Z direction. For example, the first end 251 and the second end 252 may be held in brackets or pockets (not shown) that contain the end 251 and/or the end 252 while allowing motion along the Z direction. The flexible member 250 may be attached to a support structure other than the interior wall 213. An example in which the flexible member 250 is mounted to a support structure is shown in FIGS. 6A and 6B.

The flexible member 250 is any type of durable and bendable material, and may be a material that is resistant to corrosion. The flexible member 250 may be made of any material that is suitable for outdoor applications, is non-corrosive, and maintains its structure and functionality in a wide range of outdoor temperatures (for example, between −40 degrees Celsius and 55 degrees Celsius). Moreover, the flexible member 250 is made of a material that is resilient such that the flexible member 250 does not experience permanent or persistent deformation or structural changes (or experiences only minimal persistent deformation or structural changes) despite repeated use of the bi-stable assembly 240. In other words, the flexible member 250 may be used repeatedly without experiencing structural changes that could interfere with the operation of the bi-stable assembly 240.

Specific examples of the flexible member 250, include, without limitation, a leaf spring, a linear wave spring, a strip or piece of metal, or a strip or piece of a solid polymer. A leaf spring is a spring made of one or more strips of metal that are slightly curved. A linear wave spring is a strip-shaped spring formed by one or more continuously wave shapes. The linear wave spring acts in the direction of a straight line to generate axial pressure.

Regardless of its form, the flexible member 250 may be made of stainless steel, spring steel, nylon or another plastic suitable for a compliant mechanism, or a combination of such materials. Furthermore, the flexible member 250 may include more than one component. For example, the flexible member 250 may be a collection of identical metal strips that are joined together and stacked radially. The flexible member 250 also has a finite extent into the page.

The flexible member 250 also includes a middle portion 253, which is between the first end 251 and the second end 252. The flexible member 250 includes a midpoint 258, which is halfway between the first end 251 and the second end 252. The middle portion 253 includes the midpoint 258, but also may include other parts of the flexible member 250 that are between the first end 251 and the second end 252.

The middle portion 253 is not attached to or in contact with the interior wall 213. The middle portion 253 extends away from the interior wall 213 in the Y direction. The distance in the Y direction between the interior wall 213 and the middle portion 253 of the flexible member 250 is referred to as a displacement distance 254. The displacement distance 254 may be the distance between the interior wall 213 and the midpoint 258, but this is not necessarily the case. FIG. 2B shows the flexible member 250 in a resting or uncompressed state. The displacement distance 254 is greatest when the flexible member 250 is in the resting or uncompressed state. The displacement distance 254 decreases when the flexible member 250 is fully or partially compressed (such as shown in FIG. 2D).

The flexible member 250 also includes a first holding point 255 and a second holding point 256. The first holding point 255 is between the first end 251 and the middle portion 253. The second holding point 256 is between the second end 252 and the middle portion 253. The flexible member 250 also includes a first portion 257 and a second portion 259. The first portion is between the first end 251 and the first holding point 255. The second portion 259 is between the second end 252 and the second holding point 256.

Figure 2C:
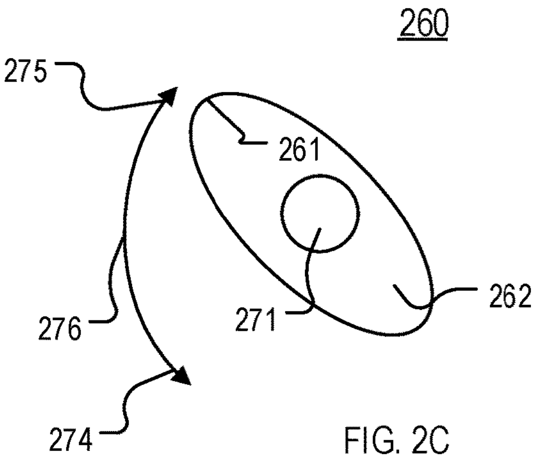
FIG. 2C is a side view of an example of a cam assembly.
Figure 2D:
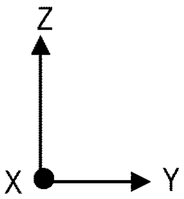
FIG. 2D is a side view of an example of a bi-stable assembly.
Figure 2D:
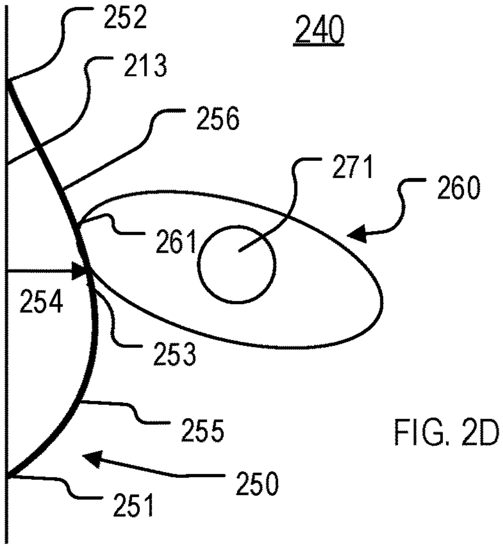

FIG. 2C is a side view of the cam assembly 260. The cam assembly 260 includes a tip portion 261 that extends from a cam body 262. In the example shown, the tip portion 261 and the cam body 262 are a single piece. In some implementations, the tip portion 261 and the cam body 262 are separate pieces that are connected to each other. The tip portion 261 has a curved profile in the Y-Z plane. However, other profiles may be used, such as shown in FIGS. 6A and 6B.

The cam assembly 260 may be made of any type of durable material that is capable of compressing the middle portion 253 without causing excessive damage to the middle portion 253. For example, the cam assembly 260 may be made of a solid plastic material, a metal, or a metal coated with a polymer. Specific examples of metallic materials that may be used for the cam assembly 260 include, without limitation, aluminum and stainless steel. The cam assembly 260 may be made of a hard polymer meant for carrying mechanical loads in outdoor environment. A specific example of such a hard polymer is bulk molding compound (BMC).

The cam body 262 is mounted to a shaft 271 that extends into the page (in the —X direction in FIGS. 2A and 2C). The shaft 271 extends through the housing 211 and is attached to an operating handle 272 that may be operated from outside of the housing 211. The handle 272 is movable along an arc 277 (FIG. 2A) from a first handle position 278 to a second handle position 279. The first and second handle positions 278 and 279 are stable positions of the handle 272. There are no intermediate stable positions of the handle 272 between the positions 278 and 279. In other words, the handle 272 does not come to a stop at any point along the arc 277 as it moves between the positions 278 and 279.

The shaft 271 and tip portion 261 rotate with the handle 272. The tip portion 261 has a range of motion along a cam arc 276 (FIG. 2C) between a first point 274 and a second point 275. The tip portion 261 is at the second point 275 when the handle 272 is in the first handle position 278. The tip portion 261 is at the first point 274 when the handle 272 is in the second handle position 279.

The cam body 262 is coupled to the actuator 230 such that the rotation of the cam body 262 moves the actuator 230 along the Z axis. The cam body 262 and the actuator 230 may be coupled to each other in any way that allows the rotation of the cam body 262 to be translated as linear motion of the actuator 230. For example, the cam body 262 and the actuator 230 may be coupled with a screw, hinge, or axle that allows the cam body 262 to rotate relative to the actuator 230 and move the actuator 230 along the Z axis. The cam body 262 and the actuator 230 may be indirectly coupled to each other. For example, the cam body 262 may drive a plate that is coupled to an operating rod that is attached to the movable contact 222*b*. Furthermore, rotation of the cam body 262 may change the state of microswitches that provide the status of the handle 272.

The tip portion 261 and the flexible member 250 are positioned relative to each other such that the tip portion 261 can rest on the first holding point 255 or the second holding point 256. Rotating the cam body 262 along the cam arc 276 causes the tip portion 261 to move along the middle portion 253, but the tip portion 261 does not rest and is not stationary on any part of the middle portion 253. In other words, the cam assembly 260 has two stable states: one in which the tip portion 261 rests on the first holding point 255 and another in which the tip portion rests on the second holding point 256.

Figure 3:
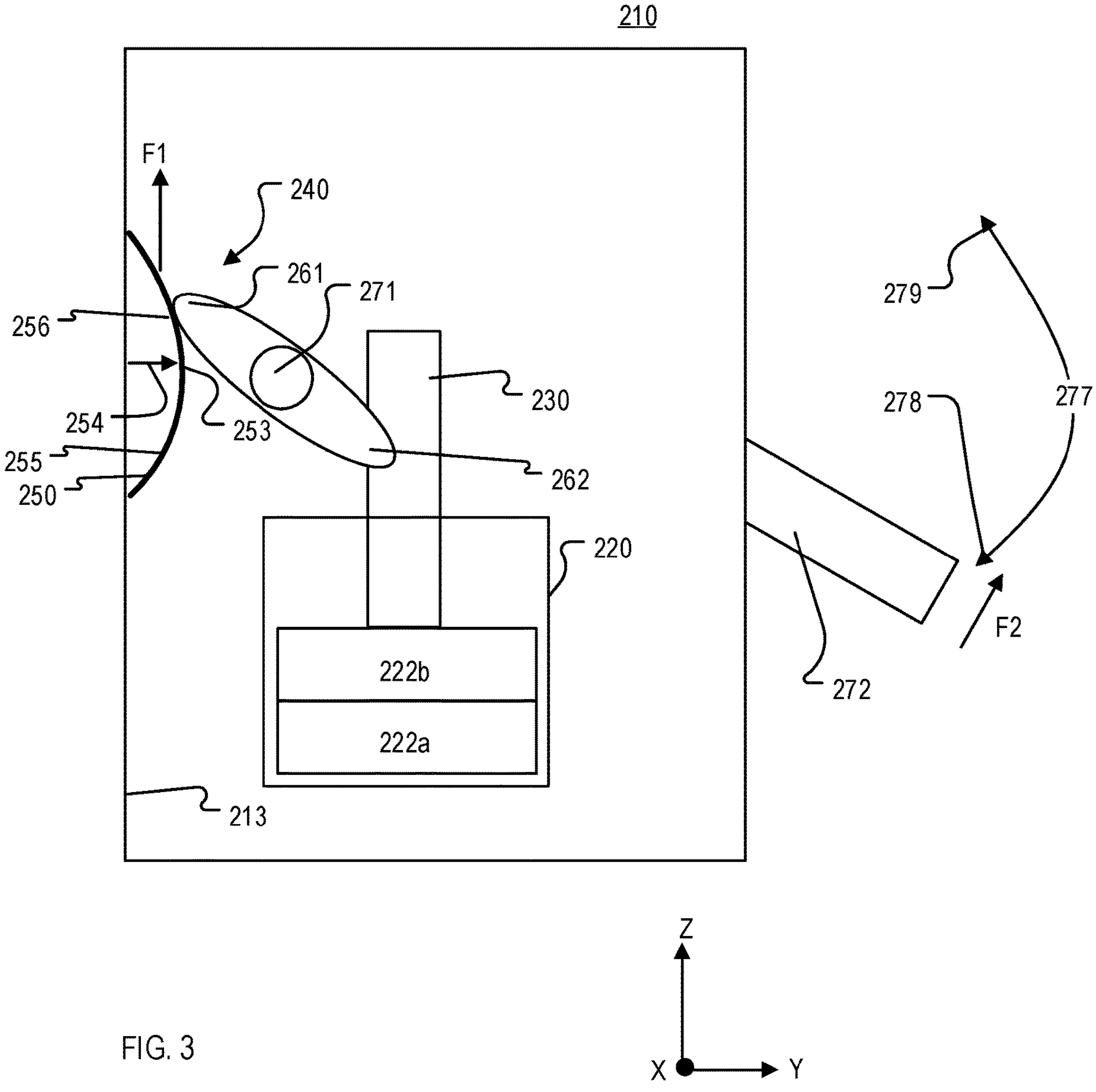
FIGS. 3-5 show an example of manual operation of the electrical apparatus of FIG. 2A.
Figure 4:
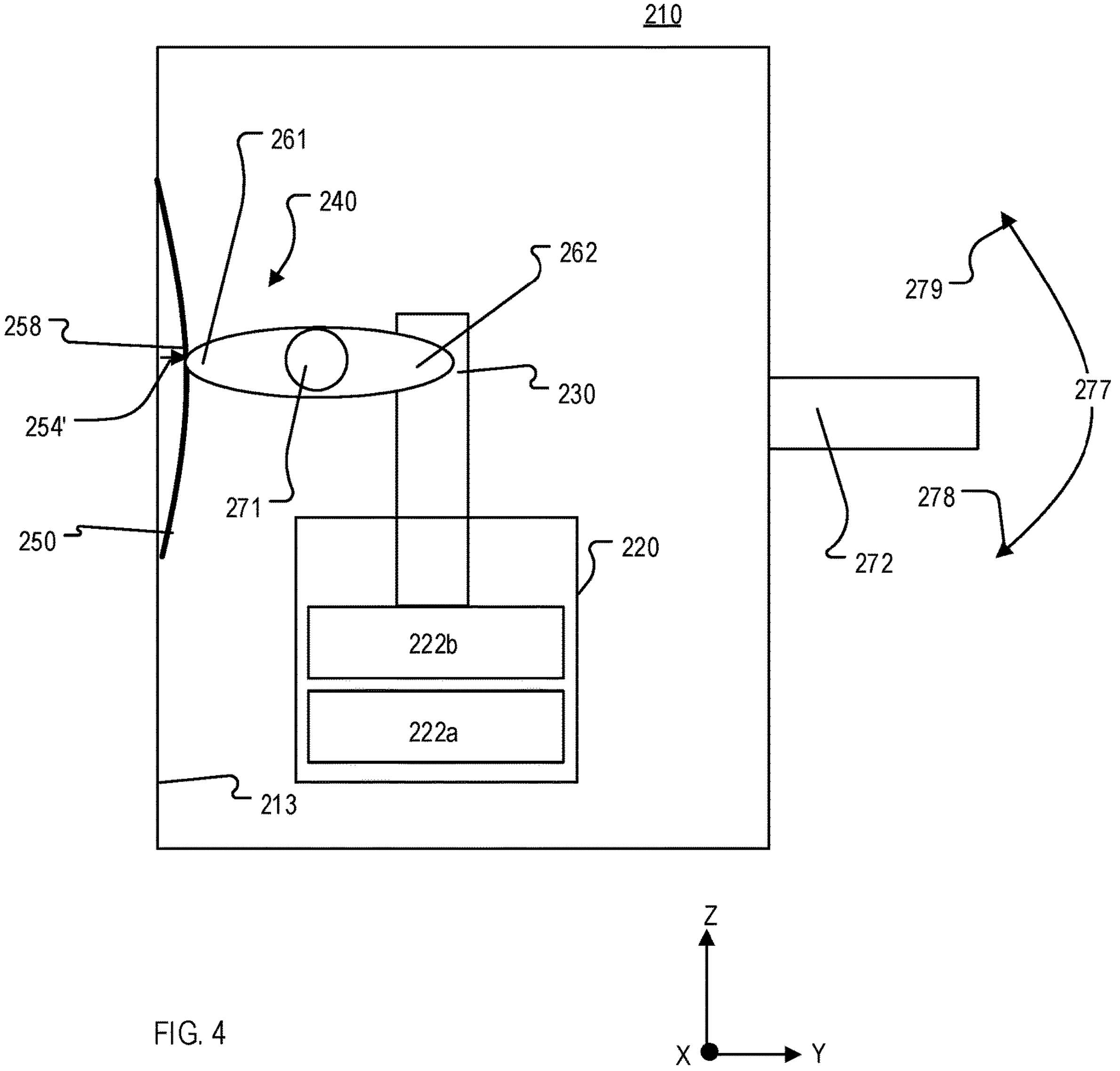
Figure 5:
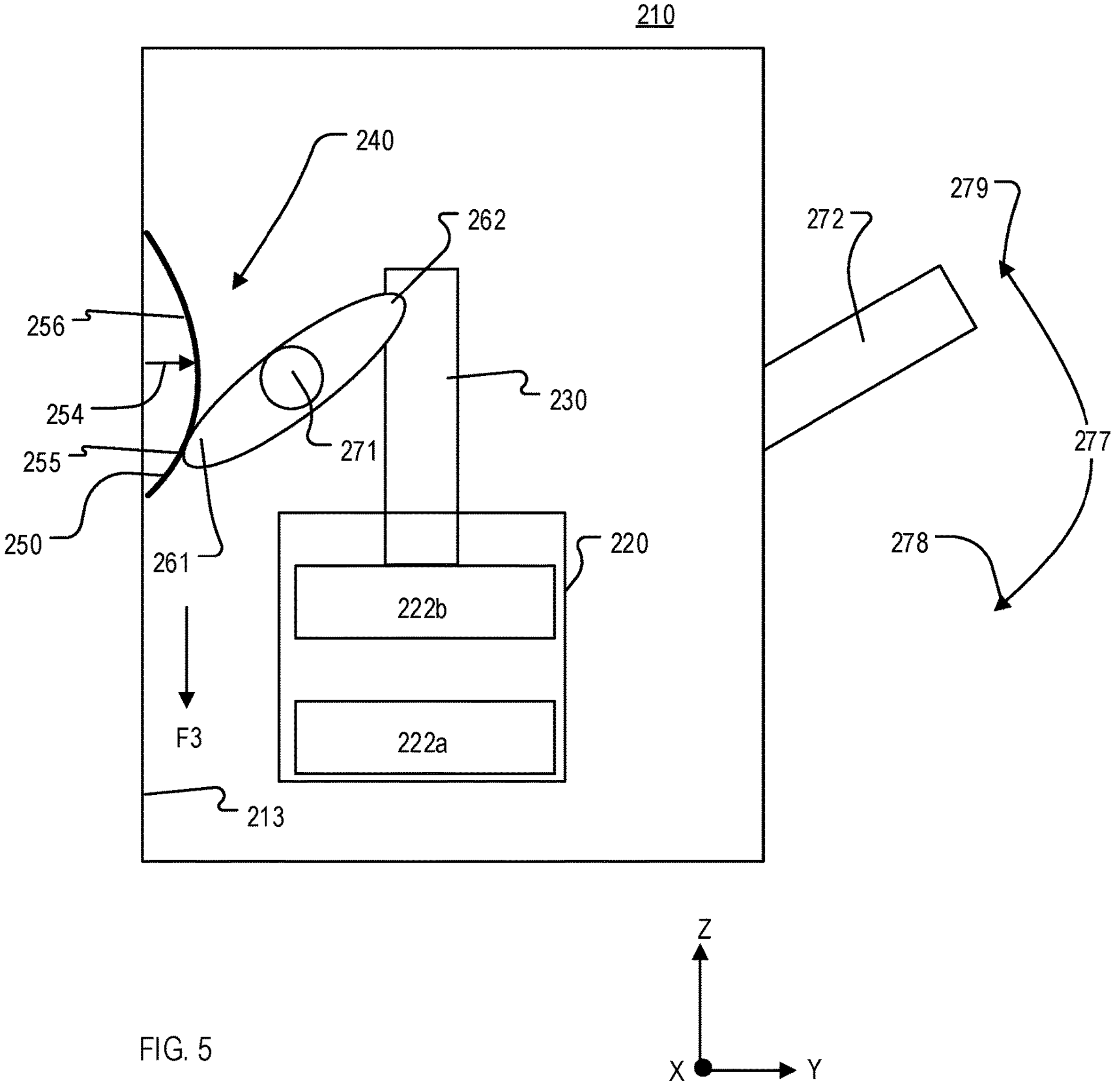

FIGS. 3-5 show manual operation of the electrical apparatus 210. FIG. 3 shows the switch assembly 220 in the closed state or ON state. The first and second electrical contacts 222*a* and 222*b* are in contact with each other. The bi-stable assembly 240 is in the first stable position, with the tip portion 261 in contact with the flexible member 250 at the second holding point 256. The flexible member 250 is in the rest or uncompressed state, and the displacement distance 254 is at the maximum value. The flexible member 250 applies a force F1 in the Z direction to the tip portion 261. The force F1 holds the tip portion 261 at the second holding point 256.

The magnitude of the force F1 depends on the characteristics of the flexible member 250. The characteristics include the curvature of the flexible member 250, the maximum value of the displacement distance 254, the thickness of the flexible member 250, the width of the flexible member 250 (width is into and out of the page in this example), the rigidity of the flexible member 250, and the extent of the middle portion 253 between the first holding point 255 and the second holding point 256. Larger maximum values of the displacement distance 254, larger extents of the middle portion 253, and/or more rigid materials increase the magnitude of the force F1. The maximum value of the displacement distance 254 may be, for example, 0.25 to 0.35 inches, 0.3 inches to 0.4 inches, 0.42 inches, or 0.4 inches to 0.5 inches. The extent of the middle portion 253 may be, for example, 2.5 inches or less. The rigidity of the flexible member 250 is determined by the type of material used for the flexible member 250, the width of the flexible member 250 (into and out of the page in FIGS. 3-5), and the thickness of the flexible member 250.

To open the switching assembly 220, an angular force F2 is applied to the handle 272. The force F2 is translated through the shaft 271 and causes the tip portion 261 to apply a force on the flexible member 250 that opposes the force F1. The handle 272 does not move along the arc 277 toward the second handle position 279 and the tip portion 261 does not move toward the first holding point 255 until the force F2 on the handle 272 is sufficient to produce an angular force at the tip portion 261 that overcomes the force F1. Thus, the configuration of the flexible member 250 and the tip portion 261 ensure that the switch assembly 220 remains in the closed state until intentionally opened.

FIG. 4 shows the electrical apparatus 210 at a time immediately after the force F2 has a magnitude that is sufficient to cause the force at the tip portion 261 to exceed the force F1. The magnitude of the force F2 that causes the handle 272 to move toward the second handle position 279 depends on the characteristics of the flexible member 250. In some implementations, the magnitude of the force F2 to move the handle 272 is between 6 and 9 pounds or between 7 and pounds. In other implementations, the magnitude of the force F2 to move the handle 272 is between 25 and 30 pounds. In still other implementations, the magnitude of the force F2 to move the handle 272 is between 34 and 44 pounds. These force values are provided as examples and other forces are possible. The bi-stable assembly 240 may be configured so that the amount of force F2 to move the handle 272 is similar to or the same as the amount of force used in legacy systems, even though the bi-stable assembly 240 is simpler and more compact than the legacy systems. Thus, operation of the handle 272 feels familiar to an experienced user.

The handle 272 moves counter clockwise along the arc 277 toward the position 279 without stopping at any intermediate points. The shaft 271 rotates the tip portion 261 counter-clockwise, the tip portion 261 moves away from the second holding point 256 along the middle portion 253 of the flexible member 250. The tip portion 261 presses the middle portion 253 toward the wall 213, the flexible member 250 expands along the Z direction, and the displacement distance 254 decreases until reaching a minimum displacement distance 254'. The minimum displacement distance 254' occurs when the flexible member 250 is in the fully compressed state. The minimum displacement distance 254' may be, for example, between 0.1 and 0.2 inches, or 0.125 inches.

As the tip portion 261 passes the midpoint 258 of the flexible member 250, the middle portion 253 begins to move back to the resting position, thereby helping to push the tip portion 261 toward the first holding point 255. The cam body 262 rotates in the counter-clockwise direction, moving the actuator 230 in the Z direction. The movable contact 222*b* is pulled in the Z direction by the actuator 230 and separates from the contact 222*a*.

Referring also to FIG. 5, the tip portion 261 moves along the middle portion 253 until reaching the first holding point 255, causing the handle 272 to move along the arc 277 until stopping at the second handle position 279. The contacts 222*a* and 222*b* are separated and the switch assembly 220 is in the opened state or OFF state. The middle portion 253 returns to the resting position and the displacement distance 254 is again at the maximum value. The curvature of the middle portion 253 applies a force F3 in the −Z direction that holds the tip portion 261 stationary at the first holding point 255. The switch assembly 220 remains in the opened state until intentionally closed. The switch assembly 220 may be closed manually using the handle 272 following the procedure outlined above, with the force on the handle 272 being applied toward the first handle position 278. In some implementations, the switch assembly 220 is prohibited from being manually closed via the handle 270. In these implementations, the switch assembly 220 may be transitioned from the open state to the closed state by electronically controlling the actuator 230. In some implementations, the manual handle 272, via the cam body 262, may be used as a mechanical interlock to prevent the closing of the switch assembly 220 via the actuator 230.

Thus, the bi-stable assembly 240 ensures that the handle 272 has two stable positions: the first handle position 278, which corresponds to the closed state of the switch assembly 220; and the second handle position 279, which corresponds to the opened state of the switch assembly 220. There are no stable positions of the handle 272 that are between the positions 278 and 279.

Configurations other than shown in FIGS. 3-5 are possible, and the electrical apparatus 210 may be oriented in a manner other than shown in FIGS. 3-5. For example, the electrical apparatus 210 may be oriented upside down compared to the orientation shown in FIGS. 3-5 such that the contact 222*a* is vertically above the contact 222*b*, and the bi-stable assembly 240 is on the right side of the apparatus 210 instead of on the left side. Moreover, the handle 272 may be configured to be pulled downward (for example, from position 279 to position 278 in FIG. 2A) to trip the switch assembly 220 open and upward (for example, from position 278 to position 279 in FIG. 2A) to close the switch assembly 220, which is consistent with many legacy switchgear. Other orientations are possible. For example, the electrical apparatus 210 may be rotated 90° clockwise or counter-clockwise compared to what is shown in FIGS. 3-5. In other words, the electrical apparatus 210 with the bi-stable assembly 240 may be oriented in any manner appropriate for the application in which the apparatus 210 is used.

FIGS. 6A and 6B are side views of a bi-stable assembly 640. The bi-stable assembly 640 is an example of an implementation of the bi-stable assembly 140 and 240. The bi-stable assembly 640 may be used in the electrical apparatus 110 instead of the bi-stable assembly 140 or in the electrical apparatus 210 instead of the bi-stable assembly 240. The bi-stable assembly 640 has two stable positions. FIG. 6A shows the bi-stable assembly 640 in a first stable position. FIG. 6B shows the bi-stable assembly 640 in a second stable position.

The bi-stable assembly 640 includes the flexible member 250 and a cam assembly 660. In the example of FIGS. 6A and 6B, the flexible member 250 is mounted to a support bracket 618. The support bracket 618 includes a main body 616 that extends along the Z direction and arms 615*a* and 615*b* that each extend from the main body 616 in the Y direction. The support bracket 618 also includes pockets or guide regions 619*a* and 619*b*. The pocket 619*a* is an open region between the main body 616 and a flange 617*a* that extends from the arm 615*a* in the −Z direction. The pocket 619*b* is an open region between the main body 616 and a flange 617*b* that extends from the arm 615*b* in the Z direction.

The flexible member 250 is mounted to the support bracket 618 by placing the end 252 in the pocket 619*a* and the 251 end in the pocket 619*b*. The size of the pocket 619*a* and the extent of the flange 617*a* is such that the end 252 remains in the pocket 619*a*. Similarly, the size of the pocket 619*b* and the extent of the flange 617*b* is such that the end 251 is held in the pocket 619*b*. However, the ends 251 and 252 are not affixed or secured to the support bracket 618. The end 252 is free to move in the pocket 619*a*, and the end 251 is free to move in the pocket 619*b*. This arrangement allows the flexible member 250 to expand along the Z axis while being compressed by the cam assembly 660 but also retains the flexible member 250 in the support bracket 618.

Moreover, the configuration of the pockets 619*a* and 619*b* is such that the expansion of the flexible member 250 occurs primarily or entirely along the Z axis. In other words, the pockets 619*a* and 619*b* hold the flexible member 250 in position for interaction with the cam assembly 660 while also allowing the flexible member 250 to expand and contract.

Although in the example shown the ends 251 and 252 are not affixed to the support bracket 618, in some implementations, one or both of the ends 251 and 252 is rigidly attached to the support bracket 618. Affixing one or both of the ends 251 and 252 to the support bracket 618 may result in less expansion and/or compression of the flexible member 250 such that functionality may be limited but still useable.

The support bracket 618 is secured within a housing or enclosure of the electrical apparatus that includes the bi-stable assembly 640. For example, the support bracket 618 may be attached to an interior wall (such as the interior wall 213 of the electrical apparatus 210).

The cam assembly 660 includes a tip portion 661 that is coupled to a cam body 662. The cam body 662 may be coupled to the actuator 230 (FIG. 1A) and may be used to move the actuator 230 and/or to change the open closed state of microswitches that provide the status of the handle 272.

The cam assembly 660 defines a mounting point 699 for mounting the cam assembly 660 onto an axle or shaft. The cam assembly 660 is mounted on the shaft 271 in FIGS. 6A and 6B. The mounting point 699 may be, for example, a circular opening that passes through the cam assembly 660 in the X direction (into and out of the page in the example of FIGS. 6A and 6B). The mounting point 699 may be molded onto the shaft 271. In some implementations, the mounting point 699 includes threads that attach to corresponding threads on the shaft 271 to attach the shaft 271 to the cam assembly 660. The tip portion 661 and the cam body 662 form a rigid body such that rotating the shaft also rotates the tip portion 661 and the cam body 662.

The tip portion 661 has mirror symmetry about an axis 665 and a curved profile 666 in the Y-Z plane. The tip portion 661 also includes a rounded point 667 that extends from the midpoint of the tip portion 661. Although the curved profile 666 is symmetric about the axis 665, the curvature of the curved profile 666 is not uniform due to the rounded point 667. When the cam assembly 660 moves between the second holding point 256 (FIG. 6A) and the first holding point 255 (FIG. 6B), the rounded point 667 and the curved profile 666 move along the middle portion 253. The rounded point 667 provides additional compressive force to the middle portion 253 such that the middle portion 253 moves closer to the main body 616 and stores additional potential energy. When the rounded point 667 moves past the midpoint 258, the middle portion 253 begins to expand outward from the main body 616. The additional potential energy causes the middle portion 253 to extend to the maximum value of the displacement distance 254 more rapidly. Thus, the rounded point 667 may facilitate more rapid transitions between the first holding point 255 and the second holding point 256.

Figure 7:
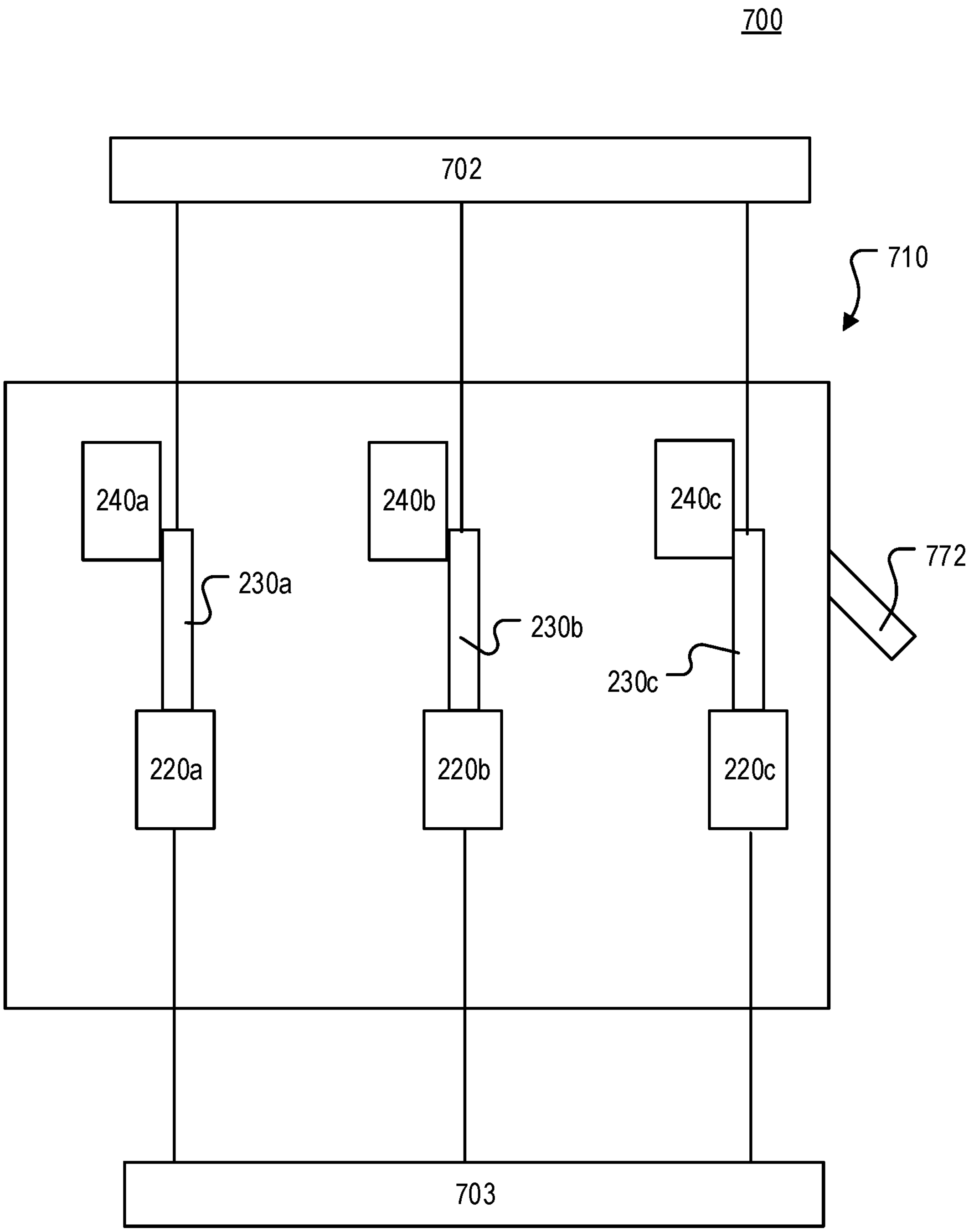
FIG. 7 is a block diagram of a system that includes an example of a three-phase electrical apparatus.

FIG. 7 is a block diagram of a system 700. The system 700 includes a three-phase electrical apparatus 710 that is connected to a three-phase source 702 and a three-phase load 703. The three-phase source 702 and the three-phase load 703 may be part of the AC power grid 101 (FIG. 1A). The phases are referred to as phase a, phase b, and phase c.

The electrical apparatus 710 includes an instance of the switch assembly 220, the bi-stable assembly 240, and the actuator 230 (FIG. 2A) for each phase. Specifically, phase a of the electrical apparatus 710 includes a switch assembly 220*a*, an actuator 230*a*, and a bi-stable assembly 240*a*; phase b of the electrical apparatus 710 includes a switch assembly 220*b*, an actuator 230*b*, and a bi-stable assembly 240*b*; and phase c of the electrical apparatus 710 includes a switch assembly 220*c*, an actuator 230*c*, and a bi-stable assembly 240*c*. The bi-stable assemblies 240*a*, 240*b*, 240*c* are coupled to a shaft (not shown) and a handle 772. The handle 772 has two stable states and is operable to open or close all of the switch assemblies 220*a*, 220*b*, 220*c* simultaneously. In other words, the electrical apparatus 710 may be configured for electrically ganged operation. Other implementations are possible. For example, the electrical apparatus 710 may include three handles, one for each phase, such that the switch assemblies 220*a*, 220*b*, 220*c* may be manually operated separately. In another example, the electrical apparatus 710 is configured as a mechanically ganged unit with a single actuator 230 that drives the contacts in the switch assemblies 220*a*, 220*b*, 220*c* open and closed. In mechanically ganged implementations, the electrical apparatus 710 includes only one instance of the actuator 230.

These and other implementations are within the scope of the claims.

What is claimed is:

1. An electrical apparatus comprising:

a switch assembly comprising:

a first electrical contact; and a second electrical contact configured to move relative to the first electrical contact, wherein the switch assembly is closed when the second electrical contact is in contact with the first electrical contact, and the switch assembly is open when the second electrical contact is not in contact with the first electrical contact;

an actuator coupled to the second electrical contact and configured to move the second electrical contact relative to the first electrical contact;

a bi-stable assembly configured to drive the actuator, the bi-stable assembly comprising:

a cam; and a flexible member comprising a first holding portion, a second holding portion, and a middle portion between the first holding portion and the second holding portion; and an operating interface coupled to the cam, wherein the operating interface is configured to rotate the cam such that the cam makes contact with and moves along the middle portion of the flexible member between a first stable position and a second stable position, the first holding portion of the flexible member is configured to hold the cam in the first stable position, and the second holding portion of the flexible member is configured to hold the cam in the second stable position.

2. The electrical apparatus of claim 1, wherein the flexible member comprises a leaf spring.

3. The electrical apparatus of claim 1, wherein the flexible member comprises a linear wave spring.

4. The electrical apparatus of claim 1, wherein the cam comprises a body and a curved tip, and the curved tip is configured to make contact with the middle portion of the flexible member.

5. The electrical apparatus of claim 1, further comprising: microswitches that provide the status of the operating interface, and wherein the cam is coupled to the actuator and configured to move the actuator, and moving the actuator changes the state of the microswitches.

6. The electrical apparatus of claim 1, wherein the flexible member comprises a single flexible strip of solid material that comprises a first end and a second end, the first end is in a first guide region of a support structure, the second end is in a second guide region of the support structure, and the middle portion is curved and extends away from the support structure.

7. The electrical apparatus of claim 6, wherein, when the operating interface rotates the cam along the middle portion, the cam presses the middle portion toward the support structure.

8. The electrical apparatus of claim 7, wherein, after the cam rotates past at least part of the middle portion, the middle portion moves away from the support structure.

9. The electrical apparatus of claim 1, further comprising a housing that encloses the switch assembly, the cam, and the flexible member; wherein the operating interface is accessible from an exterior of the housing.

10. The electrical apparatus of claim 9, wherein the operating interface comprises:

a shaft that passes through the housing; and a handle mounted on an end of the shaft that is outside the housing, wherein the cam is mounted on the shaft, and moving the handle rotates the cam along the middle portion of the flexible member.

11. The electrical apparatus of claim 10, wherein the handle is configured to be moved through a range of motion along an arc; the handle has a first stable position at a first end of the range of motion; and the handle has a second stable position at a second end of the range of motion.

12. The electrical apparatus of claim 11, wherein the handle does not have any other stable positions other than the first stable position and the second stable position.

13. A bi-stable assembly for a switch assembly, the bi-stable assembly comprising:

a cam configured to be in one of two stable positions: a first stable position, and a second stable position;

a flexible member comprising a first holding portion; a second holding portion; and a middle portion between the first holding portion and the second holding portion, wherein the middle portion of the flexible member curves outwardly away from the first holding portion and the second holding portion; and an operating interface configured to move the cam relative to the flexible member; wherein the first holding portion is configured to hold the cam in the first stable position; the second holding portion is configured to hold the cam in the second stable position; and the cam makes direct contact with the middle portion while moving between the first stable position to the second stable position.

14. The bi-stable assembly of claim 13, wherein the flexible member comprises a leaf spring.

15. The bi-stable assembly of claim 13, wherein the flexible member comprises a linear wave spring.

16. The bi-stable assembly of claim 13, wherein the flexible member has an uncompressed state; the middle portion has a first position when the flexible member is in the uncompressed state; and the cam presses the middle portion away from the first position while moving.

17. The bi-stable assembly of claim 13, wherein the cam comprises a tip, and the tip is the only part of the cam that makes direct contact with the middle portion.

18. The bi-stable assembly of claim 17, wherein the tip comprises a curved profile.

19. The bi-stable assembly of claim 13, further comprising a support that holds the flexible member, and wherein the cam presses the middle portion of the flexible member toward the support when moved.

20. The bi-stable assembly of claim 19, wherein the flexible member extends from a first end to a second end, and at least one of the first end and the second end is secured to the support.

21. The bi-stable assembly of claim 19, wherein the flexible member extends from a first end to a second end, and the first end and the second end are not secured to the support.

22. A bi-stable assembly for a switch assembly, the bi-stable assembly comprising:

a cam configured to have two stable positions: a first stable position, and a second stable position;

a flexible member comprising a first holding portion; a second holding portion; and a middle portion between the first holding portion and the second holding portion; and an operating interface configured to rotate the cam relative to the flexible member, wherein the first holding portion is configured to hold the cam in the first stable position; the second holding portion is configured to hold the cam in the second stable position; the flexible member has an uncompressed state; the middle portion has a first position when the flexible member is in the uncompressed state; and the cam presses the middle portion away from the first position while rotating.

23. A bi-stable assembly for a switch assembly, the bi-stable assembly comprising:

a cam configured to have two stable positions: a first stable position, and a second stable position;

a flexible member comprising a first holding portion; a second holding portion; and a middle portion between the first holding portion and the second holding portion;

an operating interface configured to rotate the cam relative to the flexible member, wherein the first holding portion is configured to hold the cam in the first stable position; and the second holding portion is configured to hold the cam in the second stable position; and a support that holds the flexible member, and wherein the cam presses the middle portion of the flexible member toward the support when rotated.

* * * * *